United States Patent

[11] 3,543,860

| [72] | Inventors | Fred Walker Field<br>Torrance;<br>David Walter Cayton, Whittier, California |
|---|---|---|
| [21] | Appl. No. | 601,139 |
| [22] | Filed | Dec. 12, 1966 |
| [45] | Patented | Dec. 1, 1970 |
| [73] | Assignee | Deere & Company<br>Moline, Illinois<br>a corporation of Delaware |

[54] ELECTRONICALLY CONTROLLED ROW CROP THINNING MACHINE
3 Claims, 5 Drawing Figs.

| [52] | U.S. Cl. | 172/6, 172/776 |
|---|---|---|
| [51] | Int. Cl. | A01b 63/110 |
| [50] | Field of Search | 172/6, 5, 38, 776 |

[56] References Cited

UNITED STATES PATENTS

| 2,535,720 | 12/1950 | Boncompain | 172/6 |
| 3,027,950 | 4/1962 | Cascarine | 172/5 |
| 3,358,775 | 12/1967 | Garrett | 172/6 |
| 3,402,507 | 9/1968 | Tschudy | 172/6X |
| 3,439,746 | 4/1969 | Lee | 172/6X |

FOREIGN PATENTS

| 1,490,899 | 6/1967 | France | 172/5 |

Primary Examiner—Robert E. Bagwill
Assistant Examiner—Alan E. Kopecki
Attorneys—Harold M. Knoth, William A. Murray, John M. Nolan and H. V. Harsha ABSTRACT: An electronic control circuit including a sensing circuit for comparing an observed value of electrical resistance to a predetermined threshold value and producing an output signal only when the observed value passes the threshold value; a timing circuit for measuring a predetermined time interval after the production of each such output signal; a feedback circuit for disabling the sensing circuit under control of the timing circuit during the continuance of each such time interval; a triggering flip-flop responsive to each output signal from the sensing circuit for changing its state; and a power switch and solenoid means controlled by the flip-flop for initiating a mechanical operation each time the flip-flop changes its state.

INVENTORS
FRED W. FIELD
DAVID W. CAYTON

FIG. 5.

INVENTORS
FRED W. FIELD
DAVID W. CAYTON

ELECTRONICALLY CONTROLLED ROW CROP THINNING MACHINE

CROSS REFERENCE TO RELATED APPLICATION

The present invention relates to the electronic control system for a row crop thinning machine, which thinning machine is completely disclosed in the application of David W. Cayton, William S. Tsuchiya, and Merlin D. Hosler entitled CROP THINNING MACHINE, which was filed in the United States Patent Office on Dec. 12, 1966 as Ser. No. 601,108, now U.S. Pat. No. 3,480,948 and is assigned to the same assignee as the present application.

BACKGROUND OF THE INVENTION

The present invention relates to automatic machines for thinning row crops, which according to common practice are in the first instance deliberately planted more thickly than desired so as to provide for failures in germination. The disclosed machine senses the locations of existing plants in the row and chops out portions of the row in a manner calculated to preserve the maximum number of plants consistent with the predetermined minimum spacing between plants.

The invention also relates to the field of electronics in general, and more particularly, to the application of electronics in sensing, timing, and control circuits.

The prior art has provided automatic machines for thinning row crops which were designed to arbitrarily chop out predetermined segments of each row, and has also provided a number of machines which have selected the segments of the row which are to be chopped out based upon the locations of existing plants in the row. Among the most recent U.S. Pats. disclosing this type of machine are Nos. 3,027,950; 3,097,702; 3,181,618; 3,219,124; and 3,233,681. The prior art machines have generally been lacking, however, in the necessary operating speed, efficiency, and reliability to make them useful and practical machines.

SUMMARY OF THE INVENTION

The agricultural machine provided by the present invention incorporates a swinging blade which is suspended from a point above the row crop that is to be thinned. The swinging blade has one position of rest in an elevated location on one side of the row, and another position of rest in an elevated location on the other side of the row. From time to time, based upon the locations of existing plants in the row, the blade is driven in a swinging motion through the row so as to cut out a block of plants. Hydraulic cylinder means are utilized for driving the blade first in one direction and then in the other, and the action of the cylinders is controlled by valves which are in turn electrically controlled through solenoids.

The present invention also provides a novel sensing circuit, a novel timing circuit, and a novel control circuit.

The novel sensing circuit is adapted for sensing the presence of a plant in the row by means of resistance measurement. The resistance of a plant or other physical entity contacted by an electrical probe is compared to a predetermined reference value, and a threshold-biased amplifier is utilized for producing an output signal only when the observed resistance value falls below the threshold.

The novel timing circuit of the invention utilizes a one-shot multivibrator for producing a measured time delay, a feedback circuit associated with the one-shot multivibrator for disabling the sensing circuit during the timing period of the timing circuit, and the feedback circuit also incorporates capacitor storage means for extending the disabling period beyond the timing period of the one-shot multivibrator.

The novel control circuit of the present invention incorporates a triggering flip-flop which controls a power switch for delivering energy to the solenoids which in turn control the hydraulic cylinder drive means for the plant thinning blade. The flip-flop not only controls the actuation of the blade but also serves as a memory device for remembering the position presently occupied by the blade.

Thus the objects of the invention are to provide an improved agricultural machine for thinning row crops, novel electronic circuits which may be utilized for controlling such a machine, and novel electronic circuits which may be utilized for other and unrelated purposes and applications.

BRIEF DESCRIPTION OF DRAWINGS

The objects and advantages of the invention will be more fully understood from the following description considered in conjunction with the accompanying drawings, wherein.

DESCRIPTION OF PREFERRED EMBODIMENT

Figure 1:
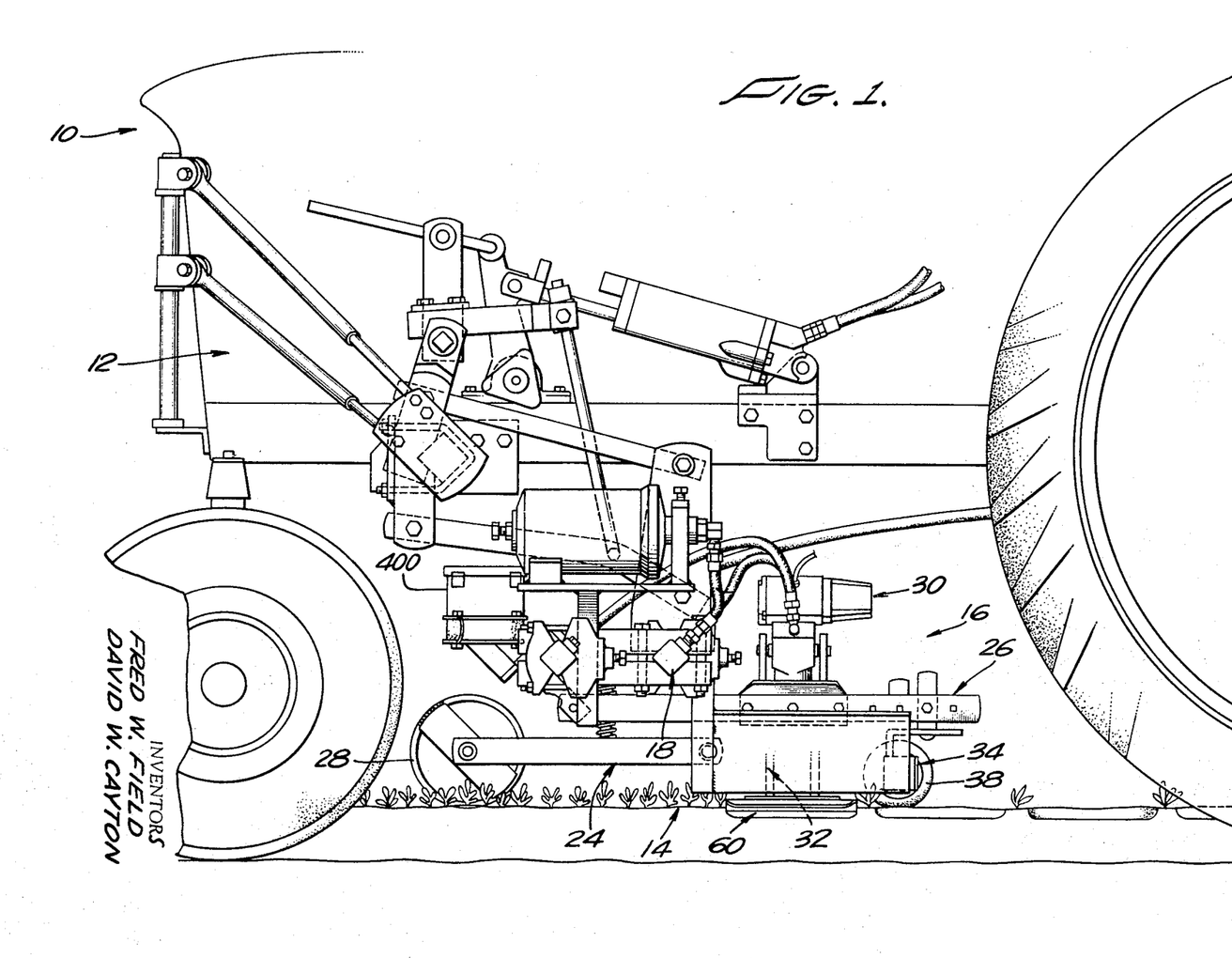
FIG. 1 is a side elevational view of the crop thinning machine of the present invention.

Referring now to the drawings, the crop thinning machine 10 comprises a vehicle 12 movable along parallel plant rows 14 to be thinned, and a crop thinning attachment 16 mounted on the vehicle. The thinning attachment has a main tool bar frame 18 including a pair of spaced parallel tool bars 20. Mounted for independent vertical floating movement on the main frame 18 are four thinner subframes 26, each of which carries a crop thinning device 30. Each thinning device includes a gauge wheel 38 located at its rearward end, and a plant detector 34 positioned immediately beside the gauge wheel. Independently suspended from the front of the main frame 18 are a pair of roller subframes 24, to each of which is attached a ground-engaging roller 28. Each of the rollers 28 is of substantial length and rolls down the ground between two adjacent ones of the plant rows 14. Two of the crop thinning devices 30 trail behind each one of the rollers 28, with the gauge wheels 38 being on the inner sides of the plant rows and trailing behind the ends of the roller 28.

Each crop thinning device 30 has a crop thinning tool or blade carrier 32 mounted directly above the associated plant row 14, for a swinging movement above the row. Attached beneath the blade 32 is a cutting blade 60 which, when the blade carrier swings from one side of the row to the other, cuts transversely through the row and thereby eliminates a block of plants. Each blade 60 has two positions of rest, one in an elevated location on one side of the plant row and the other in an elevated location on the other side of the plant row.

Figure 2:
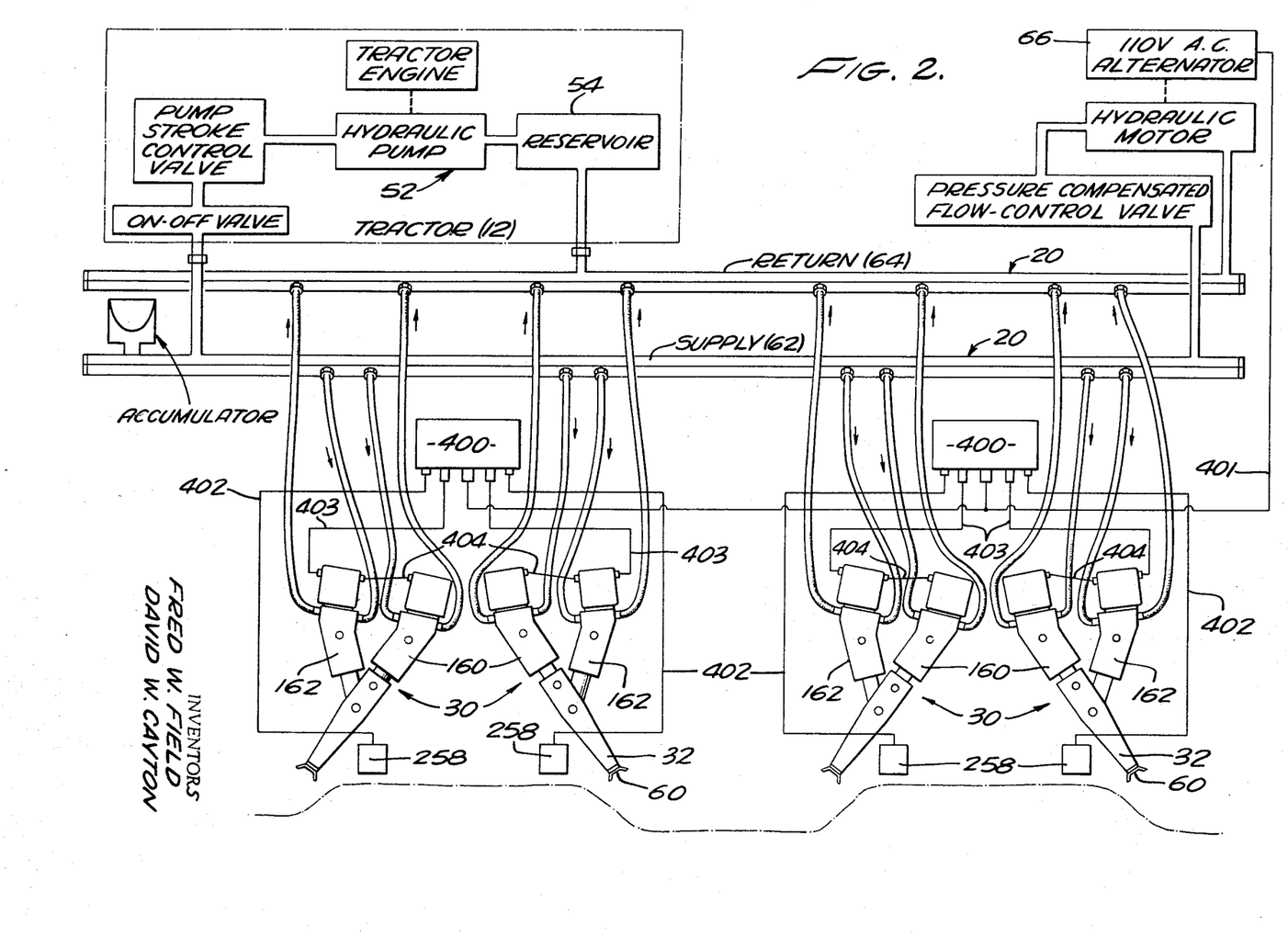
FIG. 2 is a schematic view of the hydraulic and electrical systems of the machine, the hydraulic system being shown in a two-line schematic form and the electrical system in a one-line schematic form.

Each crop thinning device 30 includes a pair of hydraulic cylinders, or linear fluid pressure actuators, 160 and 162, for driving the corresponding blade carrier 32 in an oscillatory or reciprocating motion about its pivot axis above the associated plant row. The tool bars 20 are hollow, with capped ends, and one of them serves as a hydraulic supply manifold 62, from which pressurized fluid is supplied to the cylinders 160, 162. The other tool bar 20 serves as a hydraulic return or exhaust manifold 64. Pressurized fluid is furnished to the supply manifold the supply manifold 62 from hydraulic pump 52, while low pressure fluid is returned from the return manifold 64 to a reservoir 54.

The admission of hydraulic fluid to the hydraulic cylinders 160, 162 is controlled by valve means, not specifically shown. The valves are spring loaded, and are also controlled by solenoids 216, not specifically shown. As shown in FIG. 2 the solenoids for each pair of hydraulic cylinders 160, 162 are controlled in unison. The construction and operation of the solenoids and spring-loaded valves is such that, when both solenoids are energized, the associated blade 60 is held in an elevated position on one side of the plant row, and when both solenoids are deenergized the associated blade 60 is held in an elevated position on the other side of the plant row.

Each of the plant detectors 34 includes a metallic member 258 constituting a plant probe. The probe 258 is moved along by the machine at an elevated position above the plant bed, such as to engage each plant in the row. Rollers 28 have a good electrical conductivity with ground, and the presence of each plant is determined by measuring the observed electrical resistance between the probe 258 and the rollers 28. The electrical control circuits are carried in a pair of control boxes 400, each of which serves an associated pair of the plant thinners 30. A separate electrical control circuit 72 is utilized for controlling each of the plant thinners 30. Therefore, as the vehicle 12 moves along the rows the cutting actions of the four blades 60 are not synchronized with each other, but work independently of each other and based upon the locations of plants in their respective rows.

The blade carrier 32 of each crop thinning device 30 remains in its initial rest position, as the crop thinning machine advances along the plant beds, until the probe 258 contacts a plant in the corresponding plant row. This contact completes an electrical circuit through the plant to ground and produces a response in the associated electrical control circuit 72 which effects a virtually instantaneous change in the electrical state of the solenoid-controlled valves for the hydraulic cylinders (blade carrier actuators) 160, 162. This change in valve positions results in a high velocity swinging movement of the corresponding blade carrier 32 from its initial rest position to its alternate rest position, and at the same time the thinning blade 60 is driven along an arcuate path through the soil of the adjacent plant row and removes plants and weeds in its path. Thus the cutting stroke of the blade 60 produces a plant free gap in the plant row, immediately in front of the plant that was engaged by probe 258. Accordingly, after an initial cutting stroke of the blade, the probe 258 will have to travel through this plant free gap before it will again make contact with a growing plant. When the next plant is contacted the blade will be driven in a cutting stroke in the opposite direction, again cutting a gap in front of the plant that was engaged by the probe. The blade carrier 32 and plant probe 258 are relatively positioned so that during each cutting stroke of the blade 60, the blade just misses the plant that was then engaged by the probe but removes from the plant row any plants and weeds within a region or block immediately following the engaged plant.

The general mechanical arrangement and operation of the row crop thinning machine will now be evident from the foregoing description. The machine is disclosed in complete detail in the patent application of Cayton et al. referred to previously. Attention will now be directed to the hydraulic drive system, and the electrical control system, and the general relationship between the two, in order to provide a basis for a more detailed description of the electronic controls of the present invention.

Figure 3:
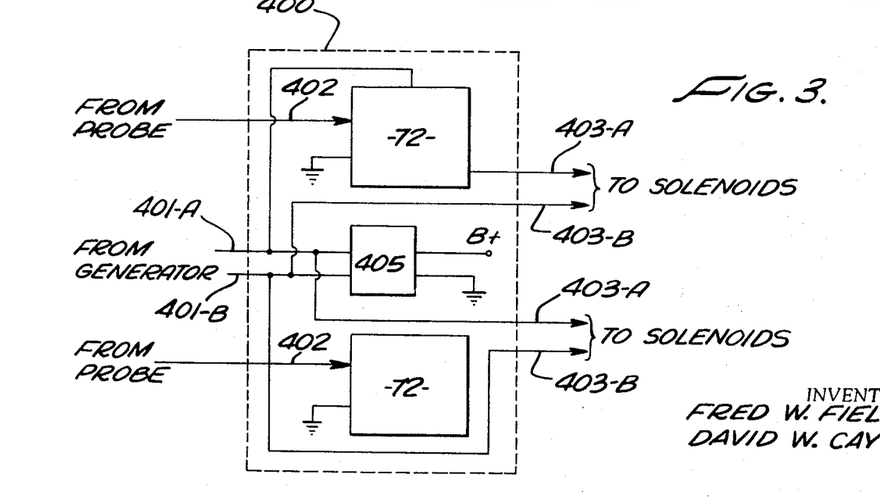
FIG. 3 is a two-line schematic diagram of the internal circuitry of one of the control boxes.

Referring to FIG. 2, a single generator 66 supported on the tool bars 20 provides 110 volt a.c. operating energy for the electrical control circuits and solenoids of all four of the crop thinners 30. Each of the crop thinners 30 includes a pair of solenoids, one for each of the hydraulic drive cylinders, the solenoid coils being designated as 216. In each crop thinner a two-conductor cable 403 (see FIG. 3) carries 110 volt energy to one of the solenoid coils 216, with the second solenoid coil being connected in parallel with the first by means of a separate two-conductor cable 404 (see FIG. 2). A separate electrical control box 400 is supported from the tool bars 20 on each side of the tractor, for housing the control circuitry for the associated pair of crop thinners. The internal wiring for each control box is shown in FIG. 3. One of the conductors 401-B contained in cable 401 from the generator extends through the interior of control box 400 without interruption to the solenoids of each of the associated pair of crop thinners, being redesignated as 403-B where it enters the cables 403 that interconnect control box 400 to the solenoids. The other conductor 401-A is connected through the associated control circuit 72, which selectively switches the power to the solenoids on and off, and thereby controls the cutting action of the associated thinner. Each control box 400 also contains a power supply circuit 405 which converts energy from the generator to low voltage d.c. form to provide operating potential for the control circuits 72.

The electrical connections to each control box include the power cable 401 previously mentioned, the solenoid cables 403 previously mentioned, and a pair of probe cables 402 which are connected to the respective probes of the associated pair of crop thinners. The presence of a plant or other object in the row crop is determined by resistance measurement between the probe 258 and ground. Therefore, each probe cable 402 contains only a single conductor, and one side of each control circuit 72 is electrically grounded, as shown in FIG. 3. The common ground connection is the metal tool bars 20; each control circuit 72 is grounded to the metal wall of the control box 400; the control box is conductively attached to the tool bar frame; and each of the rollers 28 is also conductively attached to the tool bar frame. The surface of each of the rollers 28 provides a good electrically conductive engagement with the earth or ground that is being traversed by the machine, thus completing the electrical circuit through the probe 258, probe cable 402, and the respectively associated control circuit 72.

It will be noted that the solenoid coils are not grounded to the frame of the machine but are powered by a two-conductor circuit which is independent of and insulated from the frame. This circuit includes the two conductors of cable 401, the two conductors of cable 403, and the two conductors of cable 404.

The function of each electrical control circuit 72 is to respond to signals received from the associated probe 258 so as to actuate, at the proper times, the pair of solenoids which control the operation of the cylinder valves of the associated crop thinner 30. When neither of the solenoids is energized the thinner blade occupies a raised position on one side of the row, and when both solenoids are energized the blade swings through the row and then occupies a raised position on the other side. The energization of both solenoid devices is then maintained until it is time to move the blade through the row, in another cutting action, so that it will again occupy its original position, and in order to achieve that result the solenoid devices are then deenergized. The function of each electrical control circuit 72, therefore, is to control the cutting action of the blade, whether it be changing the solenoids from a deenergized state to an energized state, or vice versa. Insofar as the cutting action of the thinner is concerned it is immaterial whether the blade movement is accomplished by solenoid energization, or by solenoid deenergization.

Figure 4:
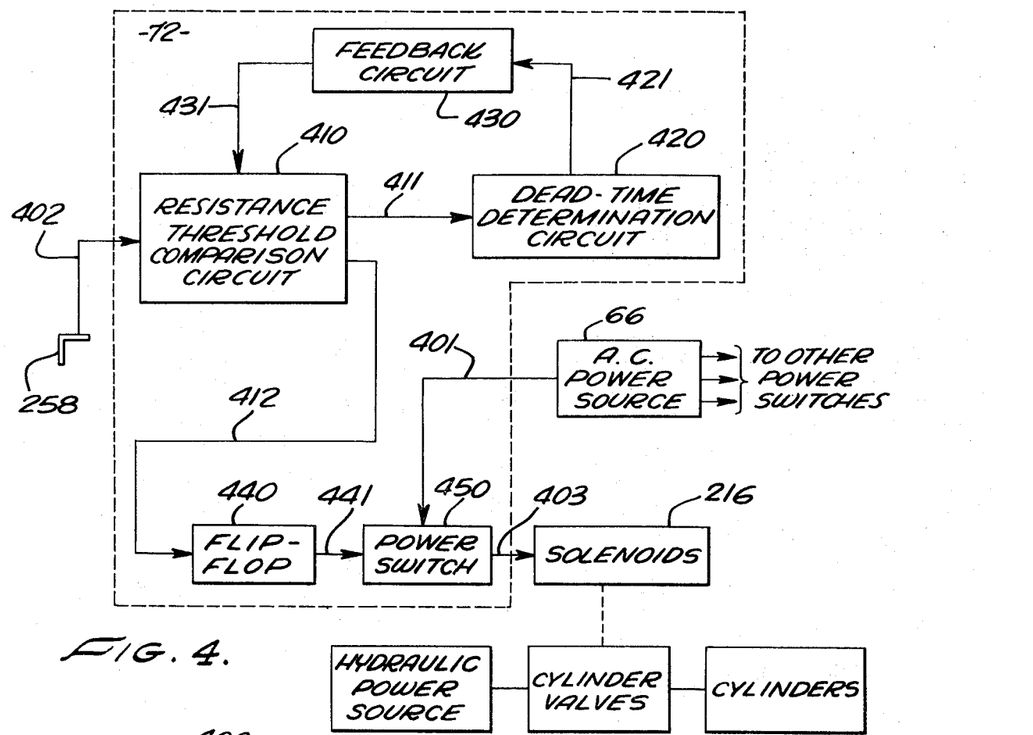
FIG. 4 is a one-line schematic diagram of the electrical control circuit for one of the thinners.

Referring now to FIG. 4 it will be seen that each of the electrical control circuits 72 includes a resistance threshold comparison circuit 410, to which the associated probe 258 is electrically connected. The function of circuit 410 is to measure the resistance value between the probe 258 and ground, and to produce an output signal whenever this resistance value falls below its predetermined threshold level. According to the presently preferred design the predetermined resistance threshold level is 5.6 megohms. When the circuit 410 determines that the input resistance observed on cable line 402 is less than this threshold value, an output signal is produced on both of the output lines 411 and 412. Of course the low probe resistance may be caused by dirt or a dead plant or other electrically conductive material, but the machine operates anyhow and will produce an erroneous result in those instances. It will be noted that circuit 410 may be considered an analog-to-digital conversion circuit, since it observes the analog value of resistance between the probe and ground and converts this to a "yes" or "no" output.

The output signal on line 411 is supplied to a dead-time determination circuit 420, which computes a predetermined time interval commencing upon its reception of a signal from circuit 410. During its measurement of this predetermined time interval, known as the dead-time, circuit 420 also sends a feedback signal on signal line 421 through a feedback circuit 430 and signal line 431 to the threshold comparison circuit 410. So long as that feedback signal is being applied to circuit 410, it is rendered incapable of accepting another input signal from line 402. When the predetermined dead-time interval has passed, as determined by circuit 420, then the feedback signal on line 431 is discontinued, and threshold circuit 410 is again able to accept an input signal from 402. The reasons for the dead-time will be subsequently explained.

The useful output signal from circuit 410 is supplied via signal line 412 to a flip-flop circuit 440. A flip-flop circuit, as is well known, is a special type of multivibrator circuit which is neither free running, nor stable in only one of its two possible states, but rather is stable in both of its two possible states. Thus an input signal is required to "flip" the flip-flop from one of its states to the other, or vice versa. As is also well known, flip-flop circuits have two separate inputs, which may be controlled and pulsed separately, which is of particular advantage in digital computation circuits where the flip-flop performs a complex function of storage and logical operations. In the present application, however, the flip-flop is preferably a triggering circuit in which both of the inputs are connected together, and the flip-flop responds to each input signal that it receives by changing its state from that which it then occupied to its alternate state.

Also contained in the control circuit 72 is a power switch 450, which is interposed between the generator 66 and the solenoid coils 216 for controlling the energization of the solenoid coils. When power switch 450 is open the solenoid coils are not energized and the blade 60 is in one of its raised positions, while when the power switch 450 is closed the solenoids are energized and the blade then swings to its other raised position. The output of flip-flop 440 is supplied on signal line 441 to the power switch 450, and the state of the power switch is therefore controlled by the state of the flip-flop. That is, the power switch is open during one state of the flip-flop and is closed during the other state of the flip-flop. The logical significance of this arrangement is that the flip-flop 440 acts as a memory or storage device for remembering the position occupied by the cutting blade 60. The threshold comparison circuit 410 has no memory, but simply generates a "yes" or "no" output, with a "yes" output meaning "it is time to cut the row." This signal is applied to the flip-flop 440, which changes its state and causes the power switch 450 and solenoid coils 216 to likewise change their conditions, resulting in movement of the blade through the row to its alternate raised position.

The main reason why dead-time is needed is the extreme sensitivity of the control circuit 72. Most or all of the plants encountered by the probe 258 have a number of separate leaves, and control circuit 72 is able to respond individually to each leaf that is encountered. In the absence of a dead-time circuit, therefore, the engagement of the probe 258 with a plant would result in not just one, but several, cutting actions of the blade. This is unnecessary and desirable. Therefore, the dead-time circuit is used for the purpose of disabling the input for a period of time which is at least equal to the time required for the machine to pass the thickest plant that would normally be encountered. The preferred circuit includes a manual selector switch for selecting a desired value of the dead-time interval.

Figure 5:
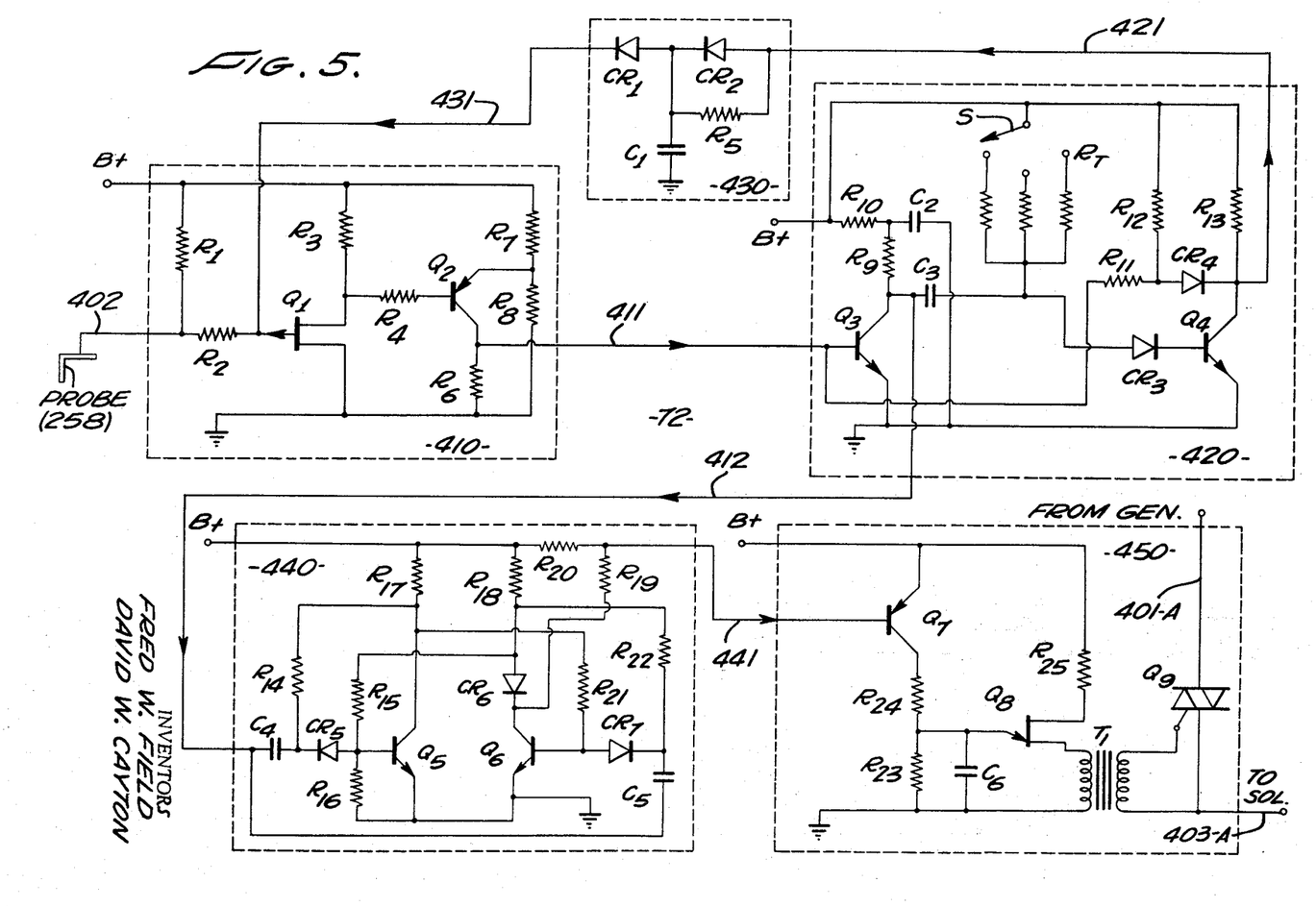
FIG. 5 is a detailed two-line schematic wiring diagram of the electrical control circuit for one of the thinners.

Reference is now made to FIG. 5 which illustrates the detailed construction of electrical control circuit 72. Each of the constituent circuits 410, 420, 430, 440, and 450 will be separately described, and thereafter the cooperative relationship of the circuits to each other will be described.

In the threshold circuit 410 a resistor R-1 is connected between probe 258 and B+, so as to provide a resistance bridge in conjunction with the observed resistance of the plant or other object contacted by the probe. A field-effect transistor Q-1 has its gate connected to the probe through a resistor R-2 while its source is connected to B+ through a resistor R-3 and its drain is grounded. A transistor Q-2 has its base connected to the source of Q-1 through a resistor R-4, while the emitter of Q-2 is connected through resistor R-7 to B+ and also through R-8 to ground. The collector of Q-2 is grounded through a resistor R-6. The presently preferred circuit values, with B+ of 12 volts, are as follows:

Q-1—U-147.
Q-2—2N3702.
R-1—5.6 megohm.
R-2—1 megohm.
R-3—12,000 ohms.
R-4—12,000 ohms.
R-6—47,000 ohms.
R-7—5,600 ohms.
R-8—5,600 ohms.

The operation of the threshold circuit is as follows. Probe 258 normally does not contact a plant or other object, hence the resistance between the probe and ground is essentially infinite. Since Q-1 is connected as a source follower the potential on its source, at the juncture of R-3 and R-4, is normally the B+ voltage of 12 volts. Q-2 is then cut off and does not conduct. It will be noted that due to the equal values of R-7 and R-8 the emitter of Q-2 is normally biased at +6 volts. When the resistance value observed by the probe drops the source voltage of Q-1 drops accordingly, and when the observed resistance reaches about 5.6 megohms, the value of R-1, the base potential of Q-2 then permits Q-2 to become conductive. Conduction of Q-2 causes substantial current to flow through R-6, raising potential on the collector of Q-2 and supplying an output signal to the signal line 411. It will be noted that this output signal is a voltage level and not a pulse. It will thus be seen that threshold circuit 410 provides a comparison between one resistance bridge resistance, and another resistance bridge consisting of R-7 and R-8, and produces an output signal only when the probe resistance drops below the point at which comparison is achieved.

Dead-time circuit 420 includes transistors Q-3 and Q-4 interconnected to form a one-shot multivibrator, that is, a multivibrator circuit having one stable state and one unstable state. A plurality of timing resistors collectively designated as $R_T$ are utilized in conjunction with a manual selection switch S for selecting the time interval that the one-shot multivibrator will remain in its unstable state, and hence the dead-time for probe 258. The signal line 411 is connected to the base of Q-3, and the emitter of Q-3 is grounded while its collector is connected to a resistor R-9. A resistor R-10 is connected between B+ and the positive end of R-9, while a capacitor C-2 is connected between the positive end of R-9 and ground. Resistor R-10 and capacitor C-2 together form a filtering circuit to prevent the one-shot multivibrator from being triggered by noise signals received from the power supply and passing through resistor R-9 to transistor Q-3. Capacitor C-3 has one terminal connected to the collector of Q-3 while its other terminal is connected to the anode of a semiconductor diode CR-3. Timing resistors $R_T$ have a commonly connected end which is connected to the second terminal of capacitor C-3, while the movable blade of switch S is utilized to connect the other end of a selected one of the resistors $R_T$ to the B+ terminal. The cathode of diode CR-3 is connected to the base of transistor Q-4, whose emitter is grounded. In the collector circuit of Q-4 a resistor R-12 provides the load, having one end connected to B+; however, another semiconductor diode CR-4 has its anode connected to the second end of R-12 while its cathode is connected to the collector of Q-4. A resistor R-13 is connected between B+ and the collector of Q-4. A coupling resistor R-11 is connected between signal line 411, that is, the base of Q-3, and the anode of diode CR-4. Output signal line 421 is connected to the collector of Q-4. The presently preferred circuit values are as follows:

Q-3—2N3707.
Q-4—2N3707.
R-9—12,000 ohms.

R-10—1,000 ohms.
C-2—0.1 microfarad.
C-3—1 microfarad.
R-11—47,000 ohms.
R-12—47,000 ohms.
R-13—47,000 ohms.
$R_T$—Minimum 300,000 ohms, maximum 820,000 ohms.

The operation of the dead-time circuit is as follows. In the normal or quiescent state of the circuit transistor Q-3 is turned off and transistor Q-4 is conducting. The charge on capacitor C-3 is then approximately equal to the power supply voltage, or 12 volts. At that same time the base potential of Q-3 is near ground, since it is not receiving any positive voltage from resistor R-6, and the current conduction of Q-4 causes almost the entire power supply voltage to appear across resistor R-12 and hence results in substantially no bias potential being applied to the base of Q-3 through resistor R-11. But when a signal is received on signal line 411 a switching action of the one-shot multivibrator takes place. The signal causes the base potential of Q-3 to be raised up and held in that raised condition; Q-3 then becomes conductive; a heavy current flows through resistor R-9, causing practically all of the power supply voltage to appear across R-9; and the potential of the Q-3 collector drops down and initially pulls with it both plates of capacitor C-3 so that the anode of diode CR-3 drops to approximately −12 volts. Q-4 is then cut off. Capacitor C-3 then commences to lose its charge in accordance with a timing cycle whose time constant is equal to the product of the capacitance value of C-3 and the resistance value of the selected one of the timing resistors $R_T$. As the charge on C-3 diminishes the anode of diode CR-3 rises up toward ground potential, and transistor Q-4 again becomes conductive. The voltage on the collector of Q-4 then falls from a value near the power supply voltage of 12 volts to a value near ground potential, and at the same time this change in potential is transmitted through resistor R-11 to the base of Q-3, causing Q-3 to become cut off. The cutting off of Q-3 does not immediately return the circuit to a condition ready for the acceptance of a new input signal, however. Rather, it is necessary for the full charge of capacitor C-3 to be restored, which is accomplished by current flowing through R-10, R-9, CR-3, and the base-emitter junction of Q-4.

The purpose of the feedback circuit 430 is to disable Q-1 from accepting an input signal until the dead-time circuit 420 has fully recovered and is ready to accept a new input signal. In feedback circuit 430 a semiconductor diode CR-2 has its anode connected to signal line 421, and a resistor R-5 is connected in parallel with CR-2. A capacitor C-1 is connected between the cathode of CR-2 and ground. A semiconductor diode CR-1 has its anode connected to the cathode of CR-2, and signal line 431 extends from the cathode of CR-1 to the gate of the field effect transistor Q-1. The preferred value of R-5 is 1 megohm, and of C-1, 0.1 microfarad.

The cooperative functioning of the threshold circuit 410, the dead-time circuit 420, and the feedback circuit 430, is more specifically described as follows. Resistors R-12, R-11, and R-6 form a voltage divider between B+ and ground, and when Q-4 is cut off the potential at the junction of R-11 and R-12 is significantly below the B+ potential. However, R-13 and CR-4 together from a decoupling circuit, the operation of which permits the collector voltage of Q-4 to remain at substantially the full B+ voltage during the time when Q-4 is cut off. Thus the full B+ voltage is supplied on signal line 421 through diodes CR-2 and CR-1 to the gate of Q-1, holding the gate at or near the B+ voltage despite any drop in the resistance value observed by probe 258. During the timing cycle of C-3 and $R_T$, previously described, current also flows through signal line 421 and diode CR-2 to charge capacitor C-1. The flow rate of this circuit is limited by R-13 which avoids any burning out of the diode CR-2. C-1 is thus charged up to the B+ voltage, and is able to maintain the gate of Q-1 at the B+ voltage even after Q-4 has again become conductive. The charge on C-1 then leaks off through R-5 and Q-4; however, this discharge time constant for C-1 is greater than the time constant for recharging C-3 through R-10 and R-9 as previously described. It will thus be seen that the feedback circuit 430 is effective to apply the feedback signal (B+ voltage) from Q-4 to the gate of Q-1 during the time when Q-4 is cut off, and is also effective thereafter for continuing to disable Q-1 until such time as capacitor C-3 in the dead-time circuit has become recharged to thereby enable the dead-time circuit to accept a new signal.

In the one-shot multivibrator 420 a complete recharging of C-3 is not necessary to permit the circuit to again switch to its unstable state; however, as previously noted, the time duration of the unstable state is a function of the charge on C-3. Therefore, in order to ensure that the full dead-time interval is obtained, it is necessary to require that C-3 be fully recharged before applying a new input signal to the circuit.

Flip-flop 440 will now be described. A pair of transistors Q-5 and Q-6 are cross coupled to provide a bistable multivibrator circuit. The emitters of both transistors are grounded. A capacitor C-4 has one terminal connected to the signal input line 412, while a semiconductor diode CR-5 has its cathode connected to the other terminal of C-4, the anode of CR-5 in turn being connected to the base of Q-5. A capacitor C-5 is also connected to signal line 412, with its other terminal being connected to the cathode of a semiconductor diode CR-7 whose anode is connected to the base of Q-6. Resistor R-17 is connected between B+ and the collector of Q-5 to provide a collector load for Q-5, and resistor R-14 is connected between the collector of Q-5 and the cathode of CR-5. Resistor R-16 is connected between base and emitter (ground) of Q-5. Resistor R-15 is connected to the base of Q-5, its other end being connected through resistor R-18 to B+. The juncture of R-15 and R-18 is connected to the anode of a semiconductor diode CR-6 whose cathode is connected to the collector of Q-6. Resistor R-21 is connected between the collector of Q-5 and the base of Q-6. Resistor R-22 is connected between the juncture of R-15 and R-18 and the cathode of CR-7. Resistor R-20 is connected to B+, and resistor R-19 is connected between the other end of R-20 and the collector of Q-6. Signal input line 441 is connected to the juncture of R-19 and R-20.

Flip-flop circuit 440 is generally conventional in its construction and operation, and also includes an output signal decoupling circuit consisting of the diode CR-6 and resistors R-19 and R-20. The circuit has two stable states, one in which Q-5 conducts and Q-6 is cut off, and the other in which Q-6 conducts and Q-5 is cut off. The circuit also has two separate inputs, represented by the capacitors C-4 and C-5, respectively, which are responsive to negative voltage pulses for switching the circuit from one stable state to the other. The effect of a received pulse upon each individual input circuit is dependent upon the then existing state which the flip-flop occupies; however, since both inputs are connected together in the so-called "triggering" circuit configuration, the result is that upon receipt of each input signal this circuit will switch from its then existing stable state into its other stable state. The effect of the output signal decoupling circuit is to decouple the signal line 441 from the load resistor R-18, so that the voltage on signal line 441 effectively swings between ground and the full B+ potential.

It will be noted in FIG. 4 that signal line 412 is shown as being derived from threshold comparison circuit 410, while in the detailed circuit of FIG. 5 it appears that signal line 412 is actually derived from dead-time circuit 420. The reason for this discrepancy is that the signal appearing on signal line 411 also appears in amplified (as well as inverted) form at the collector of Q-3, and it is advantageous to drive signal line 412 and hence flip-flop 440 with this amplified signal.

The preferred circuit values for flip-flop 440 are as follows:

Q-5—2N3707.
Q-6—2N3707.
R-14—100,000 ohms.
R-15—47,000 ohms.
R-16—47,000 ohms.

R-17—12,000 ohms.
R-18—27,000 ohms.
R-19—27,000 ohms.
R-20—27,000 ohms.
R-21—47,000 ohms.
R-22—100,000 ohms.
C-4—0.01 microfarad.
C-5—0.01 microfarad.

Power switch 450 will now be described. A transistor Q-7 has its emitter connected to the power supply terminal B+, its base connected to signal line 441, and its collector is grounded through the series combination of resistors R-24 and R-23. A capacitor C-6 is connected in parallel with R-23. A unijunction transistor Q-8 has its emitter connected to the juncture of R-23 and R-24. Base 2 of Q-8 is connected through a resistor R-25 to B+, while Base 1 is connected through the primary winding of a pulse transformer $T_1$ to ground. The secondary winding of the pulse transformer has one terminal connected to conductor 403-A which extends to the solenoid coils 216. A Triac Q-9 has its T-1 terminal connected to line 403-A. The gate of the Triac Q-9 is connected to the other terminal of the transformer secondary winding. The terminal T-2 of Q-9 is connected to conductor 401-A which extends from generator 66. The preferred circuit values for the power switch are as follows:

Q-7—2N3702.
Q-8—T1S43.
Q-9—SC41B.
R-23—47,000 ohms.
R-24—3,300 ohms.
R-25—100 ohms.
C-6—0.1 microfarad.

The operation of the power switch 450 is as follows. Energy is supplied from the generator 66 on conductor 401-A at a nominal voltage of 110 volts a.c. and a frequency of 60 cycles per second. The function of the Triac Q-9 is, when triggered, to pass both halves of each cycle of the a.c. voltage from the generator on to the solenoid windings. The unijunction transistor Q-8 and its associated circuit elements form an oscillator circuit having an oscillating frequency of at least 600 cycles per second, and more typically about 800 cycles per second. When the oscillator is running each voltage cycle produces both a positive pulse and a negative pulse, during the corresponding halves of the cycle, across the secondary winding of the pulse transformer. These pulses are applied between terminal T-1 and the gate of the Triac, and are therefore effective to trigger the Triac into a conductive state regardless of the then existing polarity of the generator voltage. Transistor Q-7 simply functions as a switch to selectively supply energy to the unijunction oscillator, or not to supply such energy, in accordance with the then existing stable state of flip-flop 440.

It will thus be seen that operating energy is selectively applied to the solenoid windings 216 under control of electronic circuitry not involving the mechanical actuation of relay contacts or the like. The circuit provides rapid switching, long useful life, and a high degree of reliability. Threshold circuit 410 provides a precise and reliable measurement of the resistance observed by the probe. Dead-time circuit 420 in conjunction with feedback circuit 430 serves to disable the threshold circuit 410 each time that an input signal is received, so as to exclude other input signals which might follow immediately thereafter but which are undesired. Flip-flop 440 controls the the operation of power switch 450 and also serves as a memory device for remembering the state or position of the solenoids and valves. The threshold circuit 410 acting by itself simply serves to recognize randomly occurring input signals and to digitize them into either a "yes" or "no" output; however, flip-flop 440 responds to each "yes" signal not only to change the state of the power switch, solenoids, and valves, but also to store the information thus received on a continuing basis until the next "yes" signal is received. Each of the control circuits 72 is compact, is easily assembled from standard components, and due to the use of solid state devices is not damaged by the vibration of the equipment during use.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

We claim: 1. An electronically controlled row crop thinning machine for thinning a row of plants growing in the ground, comprising, in combination:

a frame adapted to be advanced along said row;

an electrical probe supported from said frame and adapted to come into contact with successive plants in said row as said frame advances;

a cutting blade having an effective length in the direction of said row;

means mounting said blade from said frame ahead of said probe for swinging movement with a principal component across said row so as to provide a predetermined minimum plant spacing which is at least as great as the effective length of said blade;

ground-engaging means coupled to said frame and adapted to establish electrical contact with the ground;

an electronic control circuit connected to said probe and to said ground-engaging means;

said electronic control circuit including a resistance threshold comparison circuit coupled to said probe and operable for producing an output signal only when the effective electrical resistance of a plant or other physical entity then engaged by said probe falls below a predetermined threshold resistance value; and said control circuit further including a bistable flip-flop having two stable states and responsive to said output signal for changing from one to the other of its two stable states, a power switch controlled by said flip-flop, said control circuit additionally including a one-shot multivibrator circuit responsive to said output signal having a predetermined period, the output to said one-shot multivibrator circuit being coupled to said resistance threshold comparison circuit for disabling same during a predetermined time interval.

2. Apparatus as claimed in claim 1 which further includes a feedback circuit coupling the output of said one-shot multivibrator to said threshold circuit, said feedback circuit including capacitor means for prolonging the disabling of said threshold circuit, said feedback circuit including capacitor mean for prolonging the disabling of said threshold circuit beyond the period of said one-shot multivibrator.

3. An electronically controlled row crop thinning machine for thinning a row of plants growing in the ground, comprising, in combination:

a frame adapted to be advanced along said row;

an electrical probe supported from said frame and adapted to come into contact with successive plants in said row as said frame advances;

a cutting blade having an effective length in the direction of said row;

means mounting said blade from said frame ahead of said probe for swinging movement with a principal component across said row so as to provide a predetermined minimum plant spacing which is at least as great as the effective length of said blade;

ground-engaging means coupled to said frame and adapted to establish electrical contact with the ground;

an electronic control circuit connected to said probe and to said ground-engaging means;

said electronic control circuit including a resistance threshold comparison circuit coupled to said probe and operable for producing an output signal only when the effective electrical resistance of a plant or other physical entity then engaged by said probe falls below a predetermined threshold resistance value;

said control circuit further including means responsive to said output signal for actuating said blade to swing from one side to the other of said row;

said control circuit additionally including a one-shot multivibrator circuit responsive to said output signal having a predetermined period, the output of said one-shot multivibrator circuit being coupled to said resistance threshold comparison circuit for disabling same during a predetermined time interval; and a feedback circuit coupling the output of said one-shot multivibrator to said threshold circuit; said feedback circuit including capacitor means for prolonging the disabling of said threshold circuit beyond the period of said one-shot multivibrator.

UNITED STATES PATENT OFFICE
CERTIFICATE OF CORRECTION

Patent No. 3,543,860                    Dated    1 December 1970

Inventor(s) Fred W. Field and David W. Cayton

It is certified that error appears in the above-identified patent and that said Letters Patent are hereby corrected as shown below:

Column 10, line 25, before "an" insert -- and --; line 32, after "value;" cancel "and"; line 39, after "output", change "to" to -- of --; lines 47 and 48, cancel ", said feedback circuit including capacitor mean for prolonging the disabling of said threshold circuit".

Signed and sealed this 11th day of May 1971.

(SEAL)
Attest:

EDWARD M.FLETCHER,JR.                   WILLIAM E. SCHUYLER,
Attesting Officer                        Commissioner of Pate

FORM PO-1050 (10-69)